WIDE-ANGLE LENS

United States Patent 3,740,120
Rühl June 19, 1973

[54] WIDE-ANGLE LENS
[75] Inventor: Rudolf Rühl, Wetzlar, Germany
[73] Assignee: Ernst Leitz GmbH, Wetzlar, Germany
[22] Filed: Mar. 22, 1972
[21] Appl. No.: 236,948

[30] Foreign Application Priority Data
Mar. 26, 1971 Germany.................. P 21 14 729.5

[52] U.S. Cl................................. 350/214, 350/177
[51] Int. Cl. .............................................. G02b 9/64
[58] Field of Search..................................... 350/214

[56] References Cited
UNITED STATES PATENTS
3,622,227 11/1971 Shimizu .............................. 350/214
2,734,423 2/1956 Bertele................................ 350/214
3,545,845 12/1970 Takahashi........................... 350/214

*Primary Examiner*—John K. Corbin
*Attorney*—Krafft & Wells

[57] ABSTRACT

In a wide-angle lens comprising a negative front lens group, and a positive rear lens group the negative front lens group is composed of two negative meniscus lenses and a double-convex lens element positioned therebetween. The negative menisci consist of glass having an extremely low index of refraction and a high Abbe number, and the double-convex lens element also shows a very low dispersion. This results in a low color dispersion of the whole negative front lens group and improves greatly the possibilities for a chromatic correction in the image field. It further allows the design of the front lens element of the rear lens group as a compact meniscus, thereby overcoming the necessity of splitting this lens into a plurality of separate or cemented component lenses.

3 Claims, 1 Drawing Figure

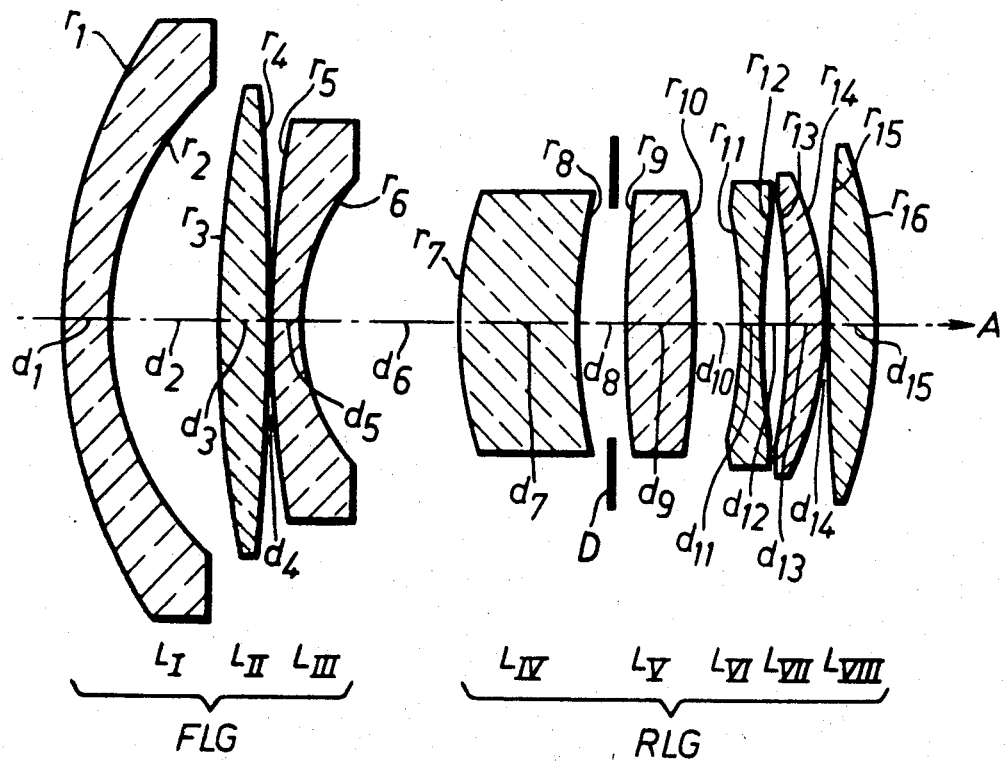

WIDE-ANGLE LENS

BACKGROUND OF THE INVENTION

The invention relates to wide-angle lenses particularly for photographic purposes for use in 35 mm SLR cameras.

It is well known to those skilled in the art that in SLR cameras the back focal distance must be considerably longer than the focal length in order to obtain sufficient space for the reflex mirror. For this reason an objective type, called the retrofocus type, has proven extremely advantageous. Lenses of this kind comprise a negative front lens group and a positive rear lens group, spaced therefrom. Advantageously the negative front lens group is composed of two negative menisci between which a positive biconvex lens is inserted. The convex surfaces of the menisci face in the direction of the object. The rear lens group comprises in a simple design three component lenses of which two are biconvex which have a biconcave component lens between them (German Pat. No. 1 076 961). Improved embodiments comprise two separate positive lens elements behind the biconcave lens in the direction of light travel (German Pat. No. 1 250 153, laid open German Pat. application No. 1 497 543, Japanese Pat. publication Nos. 44-25743, 45-39875). In all embodiments the diaphragm is positioned immediately in front of the biconcave lens. In one particular embodiment of the prior art the biconcave lens is on its front side (in the direction of light travel) cemented together with a biconvex lens, and the diaphragm is positioned immediately behind this lens group (German Pat. No. 1 447 270).

It is the particular object of the invention to improve the above described wide-angle lens type so that the overall length of the objective and the diameter of the front lens become as small as possible. The back focal length is to be greater than 1.35xf, the relative opening is to be at least f:2.8, and a good field flatness and as little distortion as possible is to be achieved up to a viewing angle of ±38°.

SUMMARY OF THE INVENTION

The above stated objects are attained by providing a wide-angle lens comprising a front lens group having a diverging effect and a rear lens group having a converging effect and being spaced from the front lens group. The front lens group comprises a first and a second negative meniscus and a collecting lens inserted therebetween. The rear lens group comprises a first and a second collective lens sub-group and a biconcave component lens therebetween. The second collective lens sub-group comprises a positive meniscus with a concave surface facing the diaphragm which is located within the rear lens group in front of the second collective lens group and a biconvex component lens.

In a lens of this type the improvement comprises in the rear lens group a first collective lens sub-group including as the first component lens in the direction of light travel a positive meniscus having a concave surface facing the diaphragm and as the second component lens a biconvex lens. The diaphragm being arranged between this first and second component lens.

According to the invention the space between the front lens group and the rear lens group is smaller than 0.35 times the focal length of the whole objective, and the space plus the thickness of the positive meniscus in front of the diaphragm along the optical axis is smaller than 0.60 times the focal length.

Further, the distance between the front vertex of the first component lens of the whole objective and the diaphragm is smaller than 1.30 times the focal length.

Still further, the indices of refraction $n_e$ of the first and the second negative menisci in the front lens groups are smaller than 1.50 and the Abbe numbers $\nu_e$ are higher than 65; and, finally, the Abbe number $\nu_e$ of the collecting lens in the front lens group is higher than 40.

BRIEF DESCRIPTION OF THE DRAWING

The invention will be more readily comprehended from the following description and data when taken in conjunction with the appending drawing, showing schematically a sectional view cut along the optical axis of the invented wide-angle lens.

DESCRIPTION OF THE PREFERRED EMBODIMENTS

Referring now to the drawing, the schematically illustrated wide-angle lens comprises the component lenses $L_I$; $L_{II}$ and $L_{III}$ which together form the front lens group FLG. The radii of the lens surfaces are numbered $r_1$ through $r_{16}$ in the direction of light travel which is the direction in which arrow A points. Likewise the thicknesses of the lenses and the lens spacings are designated $d_1$ through $d_{15}$, and the diaphragm is designated D.

The exact data of three particularly preferred embodiments are given in the Tables below. In the Tables I and II are listed the data of two wide-angle lenses having a back focal distance $s' = 1.368$
a relative opening $f$:2.8
a viewing angle of ±38°
a focal length $f = 1.0$ In Table I are given the limits wherein the lens thicknesses and spacings $d_1$ through $d_{15}$, the Abbe numbers $\nu_e$ and the surface powers $\Delta n_e/r$ in all three tables may vary.

TABLE I

| Surface Nr. (i) | Radii $r_i$ | Spacings $d_i$ | Index of refraction $n_{e,i}$ | Abbe numbers $\nu_{e,i}$ | Surface powers $\Delta n_{e,i}/r_i$ |
|---|---|---|---|---|---|
| 1 | +1.1167 | 0.0982 (+0.04) (−0.05) | 1.48914 | 70.22 (+12) (−4) | +0.4380 (±0.08) |
| 2 | +0.6392 | 0.2321 (+0.09) (−0.10) | | | −0.7652 (±0.06) |
| 3 | +3.0037 | 0.1143 (+0.04) (−0.05) | 1.60889 | 43.63 (+8) (−2) | +0.2027 (±0.26) |
| 4 | −3.8735 | 0.0036 (+0.01) | | | +0.1572 (±0.10) |
| 5 | +2.9281 | 0.0657 (+0.02) (−0.03) | 1.48914 | 70.22 (+10) (−4) | +0.1670 (±0.28) |
| 6 | +0.4488 | 0.3289 (+0.09) (−0.10) | | | −1.0900 (±0.06) |
| 7 | +0.7972 | 0.2500 (+0.09) (−0.10) | 1.67133 | 41.64 (±8) | +0.8421 (±0.08) |
| 8 | +1.3600 | 0.1071 (+0.04) (−0.05) | diaphragm area | | −0.4936 (±0.18) |
| 9 | +1.4836 | 0.1232 (+0.04) (−0.05) | 1.69401 | 54.48 (±8) | +0.4678 (±0.30) |
| 10 | −1.9806 | 0.1054 (+0.04) (−0.05) | | | +0.3504 (±0.26) |
| 11 | −1.2140 | 0.0393 | 1.79180 | 25.87 | −0.6522 |

| | | | | | |
|---|---|---|---|---|---|
| | | (+0.03) (−0.02) | | (−5) | (±0.50) |
| 12 | +1.3360 | 0.0571 | | | −0.5927 |
| | | (+0.04) (−0.03) | | | (±0.42) |
| 13 | −1.4663 | 0.0786 | 1.69401 | 54.48 | −0.4733 |
| | | (+0.04) (−0.05) | | (±10) | (±0.05) |
| 14 | −0.7251 | 0.0036 | | | +0.9571 |
| | | (+0.01) | | | (±0.12) |
| 15 | +4.1484 | 0.1071 | 1.69401 | 54.48 | +0.1673 |
| | | (+0.04) (−0.05) | | (±8) | (±0.12) |
| 16 | −1.0019 | | | | +0.6927 |
| | | | | | (±0.22) |

TABLE II

| Surface Nr. (i) | Radii $r_i$ | Spacings $d_i$ | Index of refraction $n_{e,i}$ | Abbe numbers $v_{e,i}$ | Surface powers $\Delta n_{e,i}/r_i$ |
|---|---|---|---|---|---|
| 1 | +1.2176 | 0.0982 | 1.48914 | 70.22 | +0.4017 |
| 2 | +0.6248 | 0.2321 | | | −0.7829 |
| 3 | +2.0990 | 0.1143 | 1.69232 | 49.18 | +0.3298 |
| 4 | −3.7819 | 0.0036 | | | +0.1831 |
| 5 | +10.6548 | 0.0657 | 1.48914 | 70.22 | +0.0459 |
| 6 | +0.4473 | 0.3289 | | | −1.0936 |
| 7 | +0.8361 | 0.2500 | 1.67341 | 46.82 | +0.8055 |
| 8 | +1.5835 | 0.1071 | diaphragm area | | −0.4253 |
| 9 | +1.4698 | 0.1232 | 1.69401 | 54.48 | +0.4722 |
| 10 | −2.2895 | 0.1054 | | | +0.3031 |
| 11 | −2.0951 | 0.0393 | 1.79180 | 25.87 | −0.3779 |
| 12 | +1.1189 | 0.0571 | | | −0.7077 |
| 13 | −1.3097 | 0.0786 | 1.64304 | 59.85 | −0.4910 |
| 14 | −0.7182 | 0.0036 | | | +0.8954 |
| 15 | +2.8537 | 0.1071 | 1.64304 | 59.85 | +0.2253 |
| 16 | −1.0710 | | | | +0.6004 |

In the Table III below are listed the data of an embodiment having a back focal distance $s' = 1.373$
a relative opening $f : 2.8$
a viewing angle of $\pm 38°$
a focal length $f = 1.0$

TABLE III

| Surface Nr. (i) | Radii $r_i$ | Spacings $d_i$ | Index of refraction $n_{e,i}$ | Abbe numbers $v_{e,i}$ | Surface powers $\Delta n_{e,i}/r_i$ |
|---|---|---|---|---|---|
| 1 | +1.1168 | 0.0938 | 1.48914 | 70.22 | +0.4380 |
| 2 | +0.6502 | 0.2320 | | | −0.7523 |
| 3 | +2.5134 | 0.1063 | 1.67133 | 41.64 | +0.2671 |
| 4 | −5.1781 | 0.0036 | | | +0.1296 |
| 5 | +2.6916 | 0.0659 | 1.48914 | 70.22 | +0.1817 |
| 6 | +0.4386 | 0.3330 | | | −1.1151 |
| 7 | +0.8065 | 0.2499 | 1.67341 | 46.82 | +0.8349 |
| 8 | +1.3128 | 0.1074 | diaphragm area | | −0.5130 |
| 9 | +2.1461 | 0.1343 | 1.69401 | 54.48 | +0.3234 |
| 10 | −1.6137 | 0.1053 | | | +0.4301 |
| 11 | −1.1436 | 0.0394 | 1.79180 | 25.87 | −0.6924 |
| 12 | +1.6062 | 0.0573 | | | −0.4930 |
| 13 | −1.4697 | 0.0788 | 1.69401 | 54.48 | −0.4722 |
| 14 | −0.7285 | 0.0036 | | | +0.9527 |
| 15 | +4.1926 | 0.1071 | 1.69401 | 54.48 | +0.1655 |
| 16 | −0.9818 | | | | +0.7069 |

As will readily be seen from the above Tables the invented wide-angle lens distinguishes over the prior art lenses of the same type in extremely low indicies of refraction and high Abbe numbers of the negative menisci $L_I$ and $L_{III}$. Also the biconvex component lens $L_{II}$ has only a relatively low dispersion. This results in a low color dispersion in the front lens group which makes possible a greatly improved correction of the color dispersion in the image field and, in addition, the first lens of the rear lens group, which is the lens $L_{IV}$ may be designed as a simple meniscus of which the concave surface faces the diaphragm D. It is a particular advantage over the prior art lenses that the lens $L_{IV}$ can be a component lens and needs not be separated into a plurality of component and/or cemented lenses. This would, indeed, improve the correction of the color dispersion, however it would unfavorably influence the monochromatic image errors in the image field. For the same reasons the surfaces of forming the spacing $d_{10}$ between them are designed concave in the direction towards the diaphragm and the surface powers of the two component lenses behind the diaphragm are relatively low.

Having in mind these inventive ideas it is possible to achieve a reduction of the mechanical overall dimensions of the lens which was not possible with prior art designs. The distance between the front vertex and the rear vertex of the whole lens can be smaller than 1.75 times the focal length and the diameter of the front lens can be smaller than 1.25 times the focal length. Without tolerating unduly heavy vignetting in the image corners a highly improved correction of all image errors will be achieved. Especially arranging the diaphragm D more in the direction of the front lens makes it possible to reduce the front lens diameter. However, in connection with all the other invented features this new arrangement of the diaphragm will not negatively influence the color dispersion in the image field.

I claim:

1. A wide-angle lens having a long back focal distance and comprising a negative front lens group and a positive rear lens group spaced therefrom; a diaphragm arranged in the rear lens group; the front lens group including a first negative meniscus and a second negative meniscus and a binconvex component lens therebetween; the rear lens group including a first positive lens sub-group and a second positive lens sub-group and a binconcave component lens therebetween; the second positive lens sub-group in the direction of light travel including a positive meniscus having a concave surface which faces the diaphragm and a biconvex component lens, wherein the improvement comprises:

a. a first positive lens element in the positive rear lens group which comprises in the direction of light travel a positive meniscus and a binconvex component lens with the diaphragm being arranged therebetween and the concave surface of the positive meniscus facing the diagphragm;

b. a spacing ($d_6$) between the rear vertex of the front lens group and the front vertex of the rear lens group being smaller than 0.35 times the focal length of the whole wide-angle lens;

c. a spacing ($d_6$) between the rear vertex of the front lens group and the front vertex of the rear lens group plus a lens thickness ($d_7$) of the positive meniscus in the first positive lens element in the rear lens group being smaller than 0.60 times the focal length of the whole wide-angle lens;

d. a distance between the diaphragm and the front vertex of the front lens group being smaller than 1.30 times the focal length of the whole wide-angle lens;

e. an index of refraction ($n_e$) of the negative menisci of the front lens group which is smaller than 1.50 each and corresponding Abbe numbers $v_e$ which are higher than 65 each; and f. an Abbe number $v_e$ of the biconvex component lens in the front lens groups which is higher than 40;

said lens members having substantially the following approximate specifications:

back focal distance $s' = 1.368$
a relative opening of $f : 2.8$
a viewing angle of $\pm 38°$
a focal length of $f = 1.0$

| $r_i$ | $d_i$ | $n_e$ | $v_e$ | $\Delta n_e/r_i$ |
|---|---|---|---|---|
| $r_1 = +1.1167$ | $d_1 = 0.0982$ | 1.48914 | 70.22 | +0.4380 |
| $r_2 = +0.6392$ | $d_2 = 0.2321$ | | | −0.7652 |
| $r_3 = +3.0037$ | $d_3 = 0.1143$ | 1.60889 | 43.63 | +0.2027 |
| $r_4 = −3.8735$ | $d_4 = 0.0036$ | | | +0.1572 |
| $r_5 = +2.9281$ | $d_5 = 0.0657$ | 1.48914 | 70.22 | +0.1670 |
| $r_6 = +0.4488$ | $d_6 = 0.3289$ | | | −1.0900 |
| $r_7 = +0.7972$ | $d_7 = 0.2500$ | 1.67133 | 41.64 | +0.8421 |
| $r_8 = +1.3600$ | $d_8 = 0.1071$ | diaphragm area | | −0.4936 |
| $r_9 = +1.4836$ | $d_9 = 0.1232$ | 1.69401 | 54.48 | +0.4678 |
| $r_{10} = −1.9806$ | $d_{10} = 0.1054$ | | | +0.3504 |
| $r_{11} = −1.2140$ | $d_{11} = 0.0393$ | 1.79180 | 25.87 | −0.6522 |
| $r_{12} = +1.3360$ | $d_{12} = 0.0571$ | | | −0.5927 |
| $r_{13} = −1.4663$ | $d_{13} = 0.0786$ | 1.69401 | 54.48 | −0.4733 |
| $r_{14} = −0.7251$ | $d_{14} = 0.0036$ | | | +0.9571 |
| $r_{15} = +4.1484$ | $d_{15} = 0.1071$ | 1.69401 | 54.48 | +0.1673 |
| $r_{16} = −1.0019$ | | | | +0.6027 | wherein $r_1, r_2, r_i$ ... represent the radii of curvature of the respective elements in the direction of light travel; $d_1, d_2, d_i$ ... represent the axial thicknesses of the respective elements and the air spaces of the adjacent elements in the direction of light travel; $n_e$ ... represent the refractive indices of the respective elements; $v_e$ ... represent the Abbe numbers of the respective elements; and $\Delta n_e/r_i$ represent the surface powers of the respective elements.

2. A wide-angle lens having a long back focal distance and comprising a negative front lens group and a positive rear lens group; the front lens group including a first negative meniscus and a second negative meniscus and a binconvex component lens therebetween; the rear lens group including a first positive lens sub-group and a second positive lens sub-group and a biconcave component lens therebetween; the second positive lens sub-group in the direction of light travel including a positive meniscus having a concave surface which faces the diaphragm and a biconvex component lens, wherein the improvement comprises:

a. a first positive lens element in the positive rear lens group which comprises in the direction of light travel a positive meniscus and a biconvex component lens with the diaphragm being arranged therebetween and the concave surface of the positive meniscus facing the diaphragm;
   b. a spacing ($d_6$) between the rear vertex of the front lens group and the front vertex of the rear lens group being smaller than 0.35 times the focal length of the whole wide-angle lens;
   c. a spacing ($d_6$) between the rear vertex of the front lens group and the front vertex of the rear lens group plus a lens thickness ($d_7$) of the positive meniscus in the first positive lens element in the rear lens group being smaller than 0.60 times the focal length of the whole wide-angle lens;
   d. a distance between the diaphragm and the front vertex of the front lens group being smaller than 1.30 times the focal length of the whole wide-angle lens;
   e. an index of refraction ($n_e$) of the negative menisci of the front lens group which is smaller than 1.50 each and corresponding Abbe numbers $v_e$ which are higher than 65 each; and
   f. an Abbe number $v_e$ of the binconvex component lens in the front lens group which is higher than 40; said lens members having substantially the following approximate specifications:

a back focal distance $s' = 1.368$
a relative opening of $f : 2.8$
a viewing angle of $\pm 38°$
a focal length of $f = 1.0$

| $r_i$ | $d_i$ | $n_e$ | $v_e$ | $\Delta n_e/r_i$ |
|---|---|---|---|---|
| $r_1 = +1.2176$ | $d_1 = 0.0982$ | 1.48914 | 70.22 | +0.4017 |
| $r_2 = +0.6248$ | $d_2 = 0.2321$ | | | −0.7829 |
| $r_3 = +2.0990$ | $d_3 = 0.1143$ | 1.69232 | 49.18 | +0.3298 |
| $r_4 = −3.7819$ | $d_4 = 0.0036$ | | | +0.1831 |
| $r_5 = +10.6548$ | $d_5 = 0.0657$ | 1.48914 | 70.22 | +0.0459 |
| $r_6 = +0.4473$ | $d_6 = 0.3289$ | | | −1.0936 |
| $r_7 = +0.8361$ | $d_7 = 0.2500$ | 1.67341 | 46.83 | +0.8055 |
| $r_8 = +1.5835$ | $d_8 = 0.1071$ | diaphragm area | | −0.4253 |
| $r_9 = +1.4698$ | $d_9 = 0.1232$ | 1.69401 | 54.58 | +0.4722 |
| $r_{10} = −2.2895$ | $d_{10} = 0.1054$ | | | +0.3031 |
| $r_{11} = −2.0951$ | $d_{11} = 0.0393$ | 1.79180 | 25.87 | −0.3779 |
| $r_{12} = +1.1189$ | $d_{12} = 0.0571$ | | | −0.7077 |
| $r_{13} = −1.3097$ | $d_{13} = 0.0786$ | 1.64304 | 59.85 | −0.4910 |
| $r_{14} = −0.7182$ | $d_{14} = 0.0036$ | | | +0.8954 |
| $r_{15} = +2.8537$ | $d_{15} = 0.1071$ | 1.64304 | 59.85 | +0.2253 |
| $r_{16} = −1.0710$ | | | | +0.6004 | wherein $r_1, r_2, r_i$ ... represent the radii of curvature of the respective elements in the direction of light travel; $d_1, d_2, d_i$ ... represent the axial thicknesses of the respective elements and the air spaces of the adjacent elements in the direction of light travel; $n_e$ ... represent the refractive indices of the respective elements; $v_e$ ... represent the Abbe numbers of the respective elements; and $\Delta n_e/r_i$ ... represent the surface powers of the respective elements.

3. A wide-angle lens having a long back focal distance and comprising a negative front lens group and a positive rear lens group spaced therefrom; a diaphragm arranged in the rear lens group; the front lens group including a first negative meniscus and a second negative meniscus and a biconvex component lens therebetween; the rear lens group including a first positive lens sub-group and a second positive lens sub-group and a biconcave component lens therebetween; the second positive lens sub-group in the direction of light travel including a positive meniscus having a concave surface which faces the diaphragm and a biconvex component lens, wherein the improvement comprises:

a. a first positive lens element in the positive rear lens group which comprises in the direction of light travel a positive meniscus and a biconvex component lens with the diaphragm being arranged therebetween and the concave surface of the positive meniscus facing the diaphragm;
   b. a spacing ($d_6$) between the rear vertex of the front lens group and the front vertex of the rear lens group being smaller than 0.35 times the focal length of the whole wide-angle lens;
   c. a spacing ($d_6$) between the rear vertex of the front lens group and the front vertex of the rear lens group plus a lens thickness ($d_7$) of the positive meniscus in the first positive lens element in the rear lens group being smaller than 0.60 times the focal length of the whole wide-angle lens;
   d. a distance between the diaphragm and the front vertex of the front lens group being smaller than 1.30 times the focal length of the whole wide-angle lens;
   e. an index of refraction ($n_e$) of the negative menisci of the front lens group which is smaller than 1.50 each and corresponding Abbe numbers $v_e$ which are higher than 65 each; and f. an Abbe number $v_e$ of the biconvex component lens in the front lens group which is higher than 40; said lens members having substantially the following approximate specifications:

a back focal distance $s' = 1.373$ a relative opening of $f : 2.8$ a viewing angle of $\pm 38°$ a focal length of $f = 1.0$

| $r_i$ | $d_i$ | $n_e$ | $v_e$ | $\Delta n_e/r_i$ |
|---|---|---|---|---|
| $r_1 = +1.1168$ | $d_1 = 0.0938$ | 1.48914 | 70.22 | +0.4380 |
| $r_2 = +0.6502$ | $d_2 = 0.2320$ | | | −0.7523 |
| $r_3 = +2.5134$ | $d_3 = 0.1063$ | 1.67133 | 41.64 | +0.2671 |
| $r_4 = -5.1781$ | $d_4 = 0.0036$ | | | +0.1296 |
| $r_5 = -2.6916$ | $d_5 = 0.0659$ | 1.48914 | 70.22 | +0.1817 |
| $r_6 = +0.4386$ | $d_6 = 0.3330$ | | | −1.1151 |
| $r_7 = +0.8065$ | $d_7 = 0.2499$ | 1.67341 | 46.82 | +0.8349 |
| $r_8 = +1.3128$ | $d_8 = 0.1074$ | diaphragm area | | −0.5130 |
| $r_9 = +2.1461$ | $d_9 = 0.1343$ | 1.69401 | 54.48 | +0.3234 |
| $r_{10} = -1.6137$ | $d_{10} = 0.1053$ | | | +0.4301 |
| $r_{11} = -1.1436$ | $d_{11} = 0.0394$ | 1.79180 | 25.87 | −0.6924 |
| $r_{12} = +1.6062$ | $d_{12} = 0.0573$ | | | −0.4930 |
| $r_{13} = -1.4697$ | $d_{13} = 0.0788$ | 1.69401 | 54.48 | −0.4722 |
| $r_{14} = -0.7285$ | $d_{14} = 0.0036$ | | | +0.9527 |
| $r_{15} = +4.1926$ | $d_{15} = 0.1071$ | 1.69401 | 54.48 | +0.1655 |
| $r_{16} = -0.9818$ | | | | +0.7069 | wherein $r_1, r_2, r_i \ldots$ represent the radii of curvature of the respective elements in the direction of light travel; $d_1, d_2, d_i \ldots$ represent the axial thicknesses of the respective elements and the air spaces of the adjacent elements in the direction of light travel; $n_e \ldots$ represent the refractive indices of the respective elements; $v_e \ldots$ represent the Abbe numbers of the respective elements; and $\Delta n_e/r_i \ldots$ represent the surface powers of the respective elements.

* * * * *